(12) United States Patent
Stoppa et al.

(10) Patent No.: US 11,579,291 B2
(45) Date of Patent: Feb. 14, 2023

(54) OPTICAL RANGING SYSTEM HAVING MULTI-MODE OPERATION USING SHORT AND LONG PULSES

(71) Applicant: ams Sensors Singapore Pte. Ltd., Singapore (SG)

(72) Inventors: David Stoppa, Eindhoven (NL); Stephan Beer, Eindhoven (NL); Miguel Bruno Vaello Paños, Eindhoven (NL)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 299 days.

(21) Appl. No.: 16/957,514

(22) PCT Filed: Dec. 27, 2018

(86) PCT No.: PCT/SG2018/050632
§ 371 (c)(1),
(2) Date: Jun. 24, 2020

(87) PCT Pub. No.: WO2019/132778
PCT Pub. Date: Jul. 4, 2019

(65) Prior Publication Data
US 2022/0003865 A1 Jan. 6, 2022

Related U.S. Application Data

(60) Provisional application No. 62/610,673, filed on Dec. 27, 2017.

(51) Int. Cl.
*G01S 17/10* (2020.01)
*G01S 7/481* (2006.01)
(Continued)

(52) U.S. Cl.
CPC .............. *G01S 17/10* (2013.01); *G01S 7/484* (2013.01); *G01S 7/4815* (2013.01); *G01S 7/4816* (2013.01); *G01S 7/4865* (2013.01)

(58) Field of Classification Search
CPC ...... G01S 17/10; G01S 7/4815; G01S 7/4816; G01S 7/484; G01S 7/4865
(Continued)

(56) References Cited

U.S. PATENT DOCUMENTS

2015/0362585 A1* 12/2015 Ghosh ..................... G01S 17/10
250/208.1
2016/0109232 A1 4/2016 Shin et al.
(Continued)

FOREIGN PATENT DOCUMENTS

JP 4663743 B2 4/2011
WO 2016/131658 A1 8/2016
WO 2017/178711 A1 10/2017

OTHER PUBLICATIONS

International Search Report with Written Opinion for related Application No. PCT/SG2018/050632 dated Apr. 30, 2019 (11 Pages).
(Continued)

*Primary Examiner* — Nguyen T Truong
(74) *Attorney, Agent, or Firm* — Viering, Jentschura & Partner mbB

(57) ABSTRACT

An apparatus includes a time-of-flight (TOF) sensor system that has an illuminator operable to emit pulses of light toward an object outside the apparatus. The illuminator is operable in a first mode in which the illuminator emits pulses having a first width and a second mode in which the illuminator emits pulses having a second width longer than the first width. The TOF sensor system further includes a photodetector operable to detect light produced by the illuminator and reflected by the object back toward the apparatus. An electronic control device is operable to control
(Continued)

emission of light by the illuminator and is operable to estimate a distance to the object based on a time elapsed between an emission of one or more of the pulses by the illuminator and detection of the reflected light by the photodetector.

18 Claims, 6 Drawing Sheets

(51) Int. Cl.
*G01S 7/484* (2006.01)
*G01S 7/4865* (2020.01)

(58) Field of Classification Search
USPC ........................................................ 356/5.01
See application file for complete search history.

(56) References Cited

U.S. PATENT DOCUMENTS

| | | |
|---|---|---|
| 2016/0200161 A1* | 7/2016 | Van Den Bossche .. G01S 17/89 250/206 |
| 2016/0291138 A1 | 10/2016 | Drader et al. |
| 2017/0212220 A1 | 7/2017 | Dahlman |
| 2017/0219695 A1 | 8/2017 | Hall et al. |
| 2017/0353649 A1 | 12/2017 | Yang et al. |
| 2018/0375513 A1* | 12/2018 | Li .......................... G01S 7/4911 |

OTHER PUBLICATIONS

International Preliminary Report on Patentability for related Application No. PCT/SG2018/050632 dated Jun. 30, 2020 (8 Pages).
Communication pursuant to Article 94(3) EPC issued for the corresponding European patent application No. 18 849 463.7, dated Jul. 7, 2022, 7 pages (for informational purposes only).

* cited by examiner

OPTICAL RANGING SYSTEM HAVING MULTI-MODE OPERATION USING SHORT AND LONG PULSES

CROSS-REFERENCE TO RELATED APPLICATION

This application is the U.S. national stage entry, under 35 U.S.C. § 371, of International Application No. PCT/SG2018/050632, filed Dec. 27, 2018, which claims priority to U.S. Provisional Patent Application Ser. No. 62/610,673, filed on Dec. 27, 2017, the contents of which are incorporated herein by reference in their entirety.

FIELD OF THE DISCLOSURE

This disclosure relates to optical ranging systems.

BACKGROUND

A time-of-flight sensor is an example of a range imaging system that resolves distances based on the known speed of light. As an example, a "direct" time-of-flight sensor can emit a pulse of light toward an object, and detect light that reflects from the object and returns to the sensor. The distance between the object and the sensor can be determined based on the duration between the emission of light and the return of light to the sensor (e.g., the "time of flight" of the light from the sensor to the object, and back to the sensor).

SUMMARY

The present disclosure describes optical ranging systems having multi-mode operation using short and long pulses.

For example, in one aspect, the disclosure describes an apparatus that includes a time-of-flight (TOF) sensor system. The TOF sensor system includes an illuminator operable to emit pulses of light toward an object outside the apparatus, wherein the illuminator is operable in a first mode in which the illuminator emits pulses having a first width and a second mode in which the illuminator emits pulses having a second width longer than the first width. The TOF sensor system further includes a photodetector operable to detect light produced by the illuminator and reflected by the object back toward the apparatus. An electronic control device is operable to control emission of light by the illuminator and is operable to estimate a distance to the object based on a time elapsed between an emission of one or more of the pulses by the illuminator and detection of the reflected light by the photodetector.

Some implementations include one or more of the following features. For example, in some instances, the electronic control device is operable to estimate a distance to the object based on signals from the photodetector when the illuminator is operating in the first mode if the distance to the object is within a first distance measurement range, and wherein the electronic control device is operable to estimate a distance to the object based on signals from the photodetector when the illuminator is operating in the second mode if the distance to the object is in a second distance measurement range that differs from the first distance measurement range.

In some cases, the illuminator includes multiple vertical cavity surface emitting lasers (VCSELs). A first subset of the VCSELs can be operable to emit the pulses of light having the first width, and a second subset of the VCSELs can be operable to emit the pulses of light having the second width. In some instances, the VCSELs in the first subset are of a different type from the VCSELs in the second subset, and the VCSELs of the first and second subsets are in the same monolithic die. In some implementations, the electronic control device is operable alternately to activate one of the subsets of VCSELs at a time.

Further, in some cases, a third subset of the VCSELs is operable to emit pulses of light having a third width that differs from the first and second widths, wherein the illuminator is operable in a third mode in which the third subset of VCSELs emits pulses having the third width, and wherein the electronic control device is operable to estimate a distance to the object based on signals from the photodetector when the illuminator is operating in the third mode if the distance to the object is within a third distance measurement range that differs from the first and second distance measurement ranges.

Details of the pulse width and power depend on the implementations. In some cases, the illuminator is operable in the first mode to emit pulses having a width of less than 100 psec, and is operable in the second mode to emit pulses having a width greater than 100 psec. Also, in some instances, the illuminator is operable in the first mode to emit pulses having a first optical power level, and the illuminator is operable in the second mode to emit pulses having a second optical power level greater than the first optical power level. For example, in some implementations, the illuminator is operable in the first mode to emit pulses having a power less than 100 mW, and the illuminator is operable in the second mode to emit pulses having a power greater than 100 mW.

In another aspect, the disclosure describes a host device that includes a time-of-flight (TOF) sensor system, a display screen, and a processor to adjust a brightness of the display screen in response to a distance estimated by the electronic control device.

In a further aspect, the disclosure describes a method including emitting pulses of light toward an object, wherein emitting pulses includes alternately emitting pulses in a first mode and a second mode. In in the first mode, the pulses have a first width, and in the second mode, the pulses have a second width longer than the first width. The method includes detecting light reflected by the object, and estimating a distance to the object based on a time elapsed between emission of one or more of the pulses and detection of the light reflected by the object. In some instances, different subsets of groups of VCSELs (or other light emitting elements) can be used for each respective mode. In some cases, different types of VCSELs are provided in the same VCSEL die, and selected ones of the VCSELs are activated depending on the mode of operation.

The implementations described herein can provide a variety of benefits. In some implementations, a time-of-flight sensor can obtain measurements that are more accurate and/or precise (e.g., compared to measurements conducted without the performance of the disclosed techniques). In particular, the disclosure can help extend the effective distance measurement range of the time-of-flight sensor.

Other aspects, features and advantages will be readily apparent from the following detailed description, the accompany drawings, and the claims.

DETAILED DESCRIPTION

A time-of-flight (TOF) sensor can resolve distances between the sensor and an object. The distance resolution of a time-of-flight sensor depends, at least in part, on the sensor's ability to determine the elapsed time between the emission of light of and the return of reflected light precisely (e.g., using one or more timekeeping components, such as a time to digital converter (TDC)).

Figure 1:
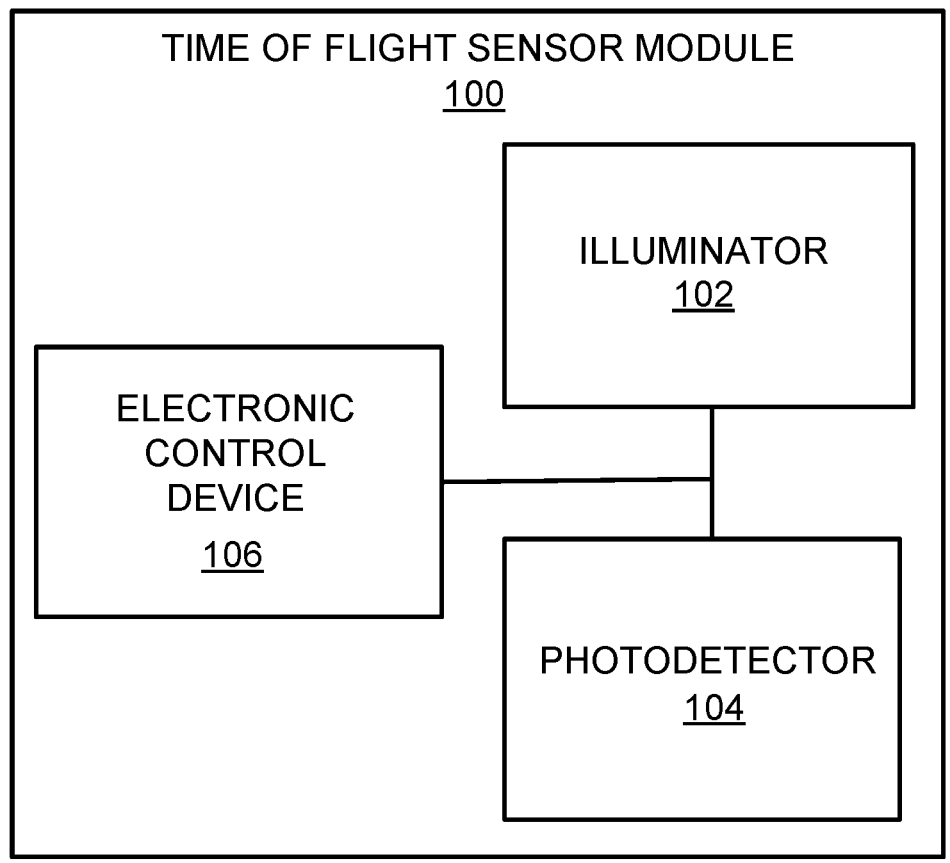
FIG. 1 is a schematic diagram of an example time-of-flight sensor system.

An example TOF sensor system 100 is shown in FIG. 1. The sensor system 100 includes an illuminator 102 operable to emit pulses of light, a photodetector 104 operable to detect light at the same wavelength as the light produced by the illuminator 102, and an electronic control device 106. In an example usage of the sensor system 100, the illuminator 102 generates pulses of light (e.g., infrared), which is emitted toward a subject (e.g., an object in proximity to the sensor system 100). The photodetector 104 measures light that is reflected from the subject and returns to the sensor system 100. The electronic control device 106 is operable to determine the distance between the object and the sensor system 100 based on the time that elapses between the light being emitted and the reflected light being sensed. In some cases, the electronic control device 106 is housed within a TOF sensor module itself; in other cases, it may be housed in a host device in which the TOF sensor module is disposed.

Figure 2:
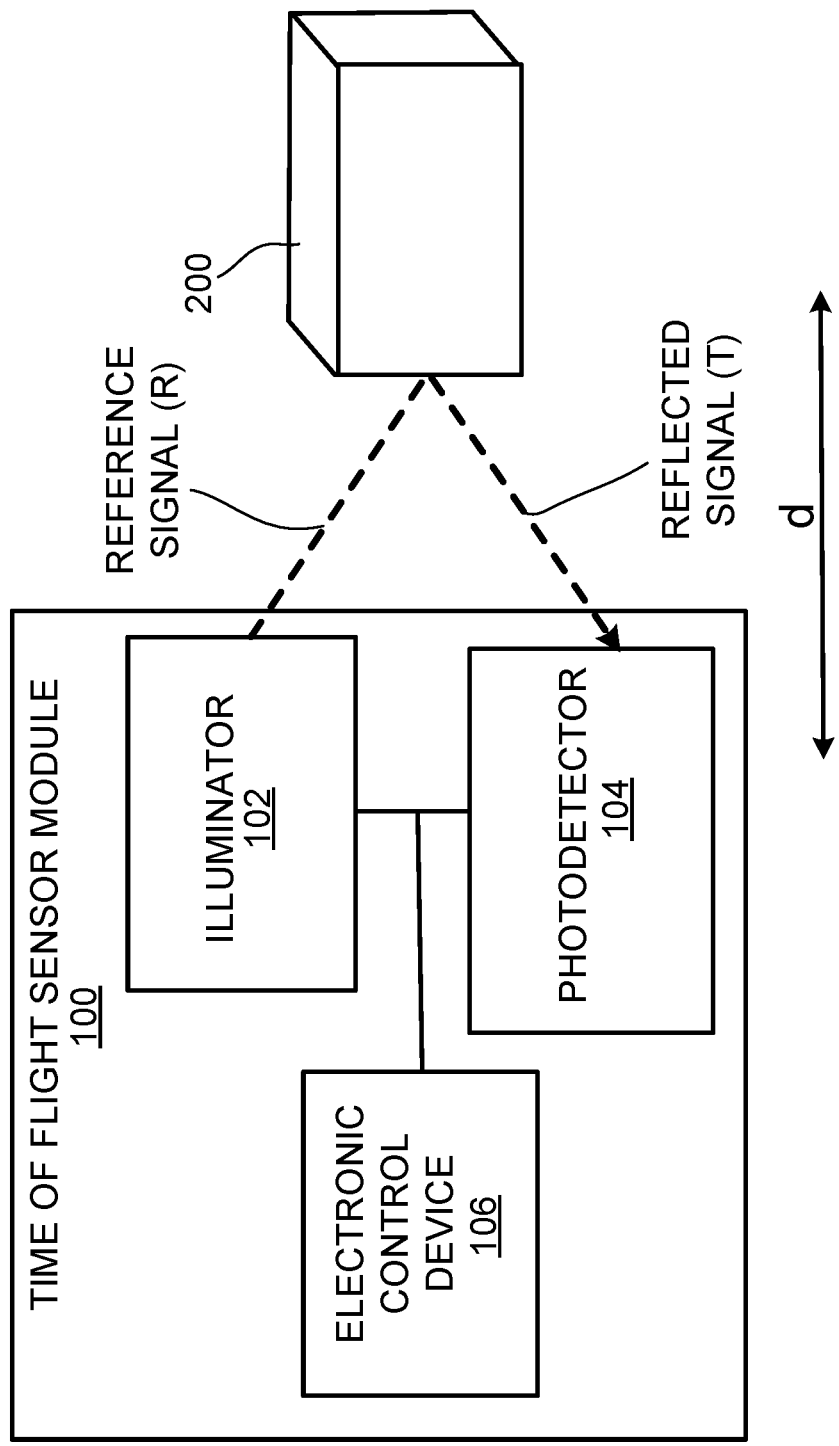
FIG. 2 is a diagram showing an example usage of a time-of-flight sensor system.

To illustrate, FIG. 2, shows an example usage of the sensor system 100. In this example, the sensor system 100 is in proximity to an object 200. The illuminator 102 is operable to generate light R (e.g., based on instructions from the electronic control device 106), which is directed toward the object 200. At least some of the emitted light reflects from the object 200 and returns to the photodetector 104 in the form of a reflected signal T. The photodetector 104 measures the reflected signal T, and transmits information regarding the measurements to the electronic control device 106. The electronic control device 106 then determines the distance (d) to the object 200, for example, based on the elapsed round-trip time (t) and the speed of light (c) (e.g., $d = (t \times c)/2$).

In some instances, each incoming signal detected by the photodetector 104 can be categorized into one of multiple bins, where each bin represents, for example, a narrow range of time from emission of the outgoing signal by the illuminator 102 until detection of the signal by the photodetector 104. The number of counts for each respective bin can be integrated over a specified time interval. A bin histogram can be used by the electronic control device 106 to estimate the distance to the object 200.

Figure 3A:
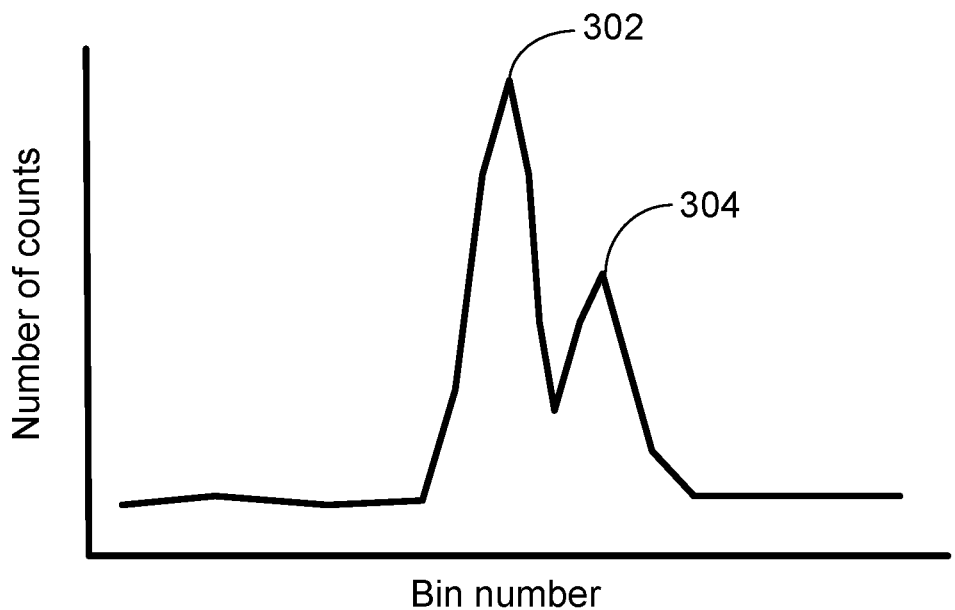
FIGS. 3A and 3B are example graphs of bin number (distance) versus the number of counts.
Figure 3B:
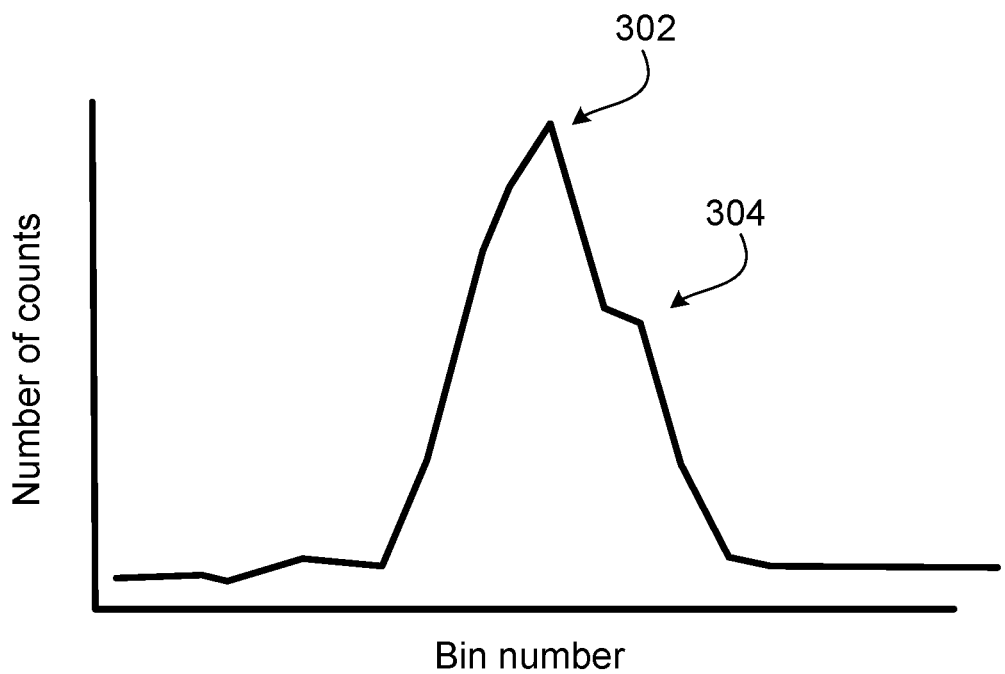
Figure 4A:
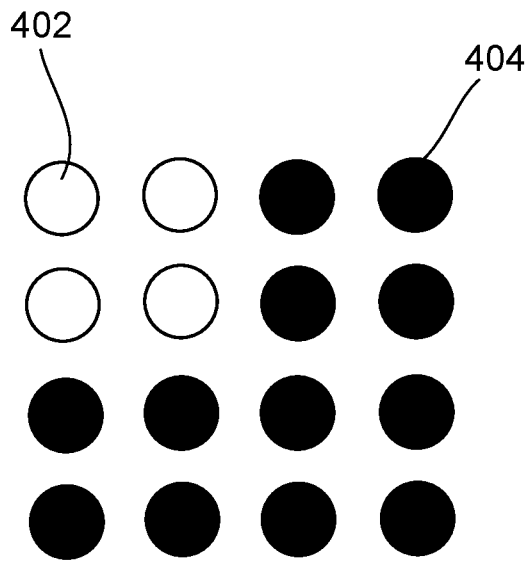
FIGS. 4A through 4D illustrate examples of VCSEL arrays for the illuminator.
Figure 4B:
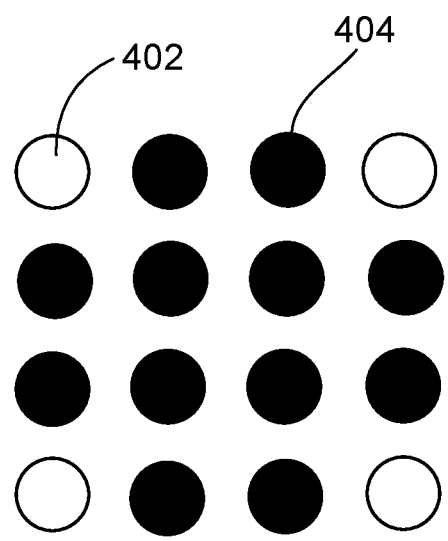
Figure 4C:
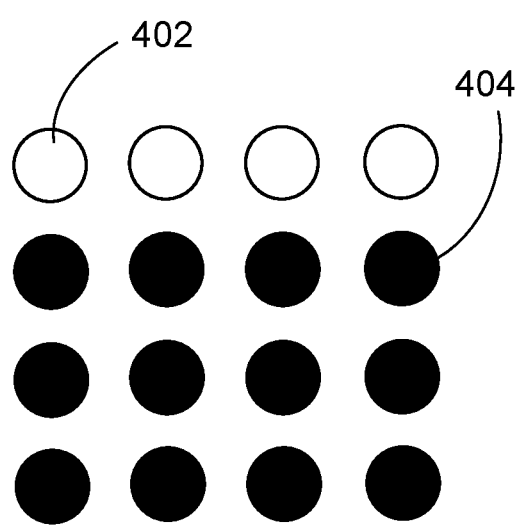
Figure 4D:
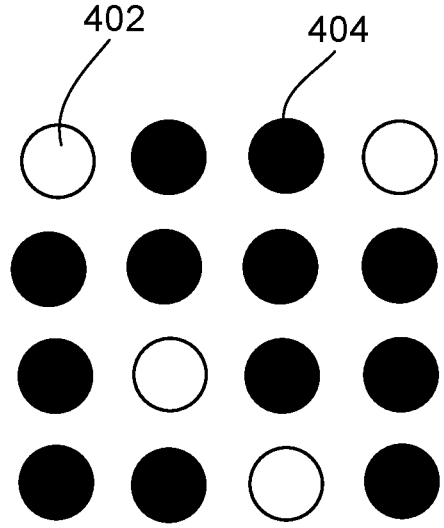

In some applications, the sensor 100 is disposed beneath a cover glass of a host device (e.g., a smartphone). In such instances, the photodetector 104 may sense reflections both from the cover glass as well as the subject 200. In some cases, as shown in FIG. 3A, reflections from the cover glass can be identified as a peak signal 302 separate from a peak signal 304 representing reflections from the subject 200. However, if the subject is very close to the cover glass, then the two peaks 302, 304 may merge such that are not easily distinguishable (see FIG. 3B). As the signal representing reflections from the cover glass decreases the signal-to-noise ratio, the distance to the subject 200 cannot easily be obtained.

To obviate the foregoing problem, the illuminator 102 is operable in at least two modes: a first mode in which the illuminator 102 emits relatively short pulses at relatively low power, and a second mode in which the illuminator 102 emits relatively long pulses at relatively high power. As an example, in some implementations, the illuminator 102 is operable to emit pulses having a width on the order of 100 picoseconds (psec) or less and a power of 100 milliwatts (mW) or less during the first mode of operation. During the second mode of operation, the illuminator 102 emits pulses having a width of more than 100 psec and a power of more than 100 mW. The pulse width can refer, for example, to the full width at half maximum (FWHM), that is, the width of the time interval within which the power is at least half the peak power. The first mode of operation can be particularly advantageous for measuring relatively short distances, whereas the second mode of operation can be particularly advantageous for measuring relatively long distances.

In some cases, the illuminator 102 includes multiple light emitting elements, such as an array of vertical cavity surface emitting lasers (VCSELs). A first subset of the VCSELs is composed of VCSELs operable to emit the shorter pulses at the lower power, whereas a second subset of the VCSELs is composed of VCSELs operable to emit the longer pulses at the higher power. In some implementations, the first subset of VCSELs can be particularly advantageous for measuring relatively short distances (e.g., a few millimeters (mm)), whereas the second subset of VCSELs can be particularly advantageous for measuring relatively long distances (e.g., up to a meter (m)). The subsets of VCSELs can be optimized for other ranges as well (e.g., by using VCSELs having appropriate pulse widths and power).

The arrangement and number of VCSELs can vary depending on the particular implementation. FIGS. 4A through 4D illustrate several examples of VCSEL arrangements, including VCSELs 402 in the first subset (i.e., operable to emit shorter pulses) and VCSELs 404 in the second subset (i.e., operable to emit longer pulses). One factor that affects the number of VCSELs in each subset is the total optical power needed for each mode of operation. In general, optical power received by the photodetector 104 is inversely proportional to the square of the distance to the subject 200. Thus, more power typically is required to determine the distance when the subject 200 is further away than when it is closer. Although FIGS. 4A-4D show 4×4 VCSEL arrays, other size arrays or configurations can be used as well.

In some implementations, there are a greater number of VCSELs in the second subset 404 than in the first subset 402. Thus, in the illustrated examples, the ratio of VCSELs in the first subset 402 to those in the second subset 404 is 1:3. However, this ratio can differ in other implementations. For example, in some cases, a ratio of about 1:10 may be appropriate. The VCSELs in the first subset 402 can be of a different type from the VCSELs in the second set 404. For example, depending on the arrangement of the VCSELs, the field of emission for the first subset of VCSELs and the second subset of VCSELs may differ from one another. In other instances, the VCSELs of both subsets 402, 404 may be of the same type, but each of the VCSELs can be dedicated to operate in a particular one of the modes. The different subsets of VCSELs may be optimized for the number of VCSELs in each subset, as well as for routing and location. They also may differ in shape and make.

In some cases, the VCSELs of the first and second subsets can be implemented in or on the same monolithic semiconductor die. Wire bonding or other electrical connections for the shorter pulse VCSELs can be adjusted to reduce capacitance and ensure high-speed operation.

The photodetector 104 can be implemented, for example, as a Single-Photon Avalanche Diode (SPAD) that is operable to measure the intensity of light emitted from the light source 102 and reflected from the subject back toward the photodetector 104. Although other types of photodetectors can be used, a SPAD is useful for detecting low intensity signals and to signal the time of the photon arrival with high temporal resolution (e.g., a few tens of picoseconds).

The electronic control device 106 is coupled to the illuminator 102 and is operable to control, for example, which VCSELs in the illuminator are turned on or off at particular times. The electronic control device 106 also can control the operation of the photodetector 104. For example, the electronic control device 106 can be coupled to the photodetector 104 and selectively can turn on or off the photodetector 104 (e.g., to measure light during selected periods of time, such as during a measurement operation). Further, the electronic control device 106 can obtain information describing the characteristics of the measured light (e.g., the time at which the light is measured and the intensity of the measured light).

Figure 5:
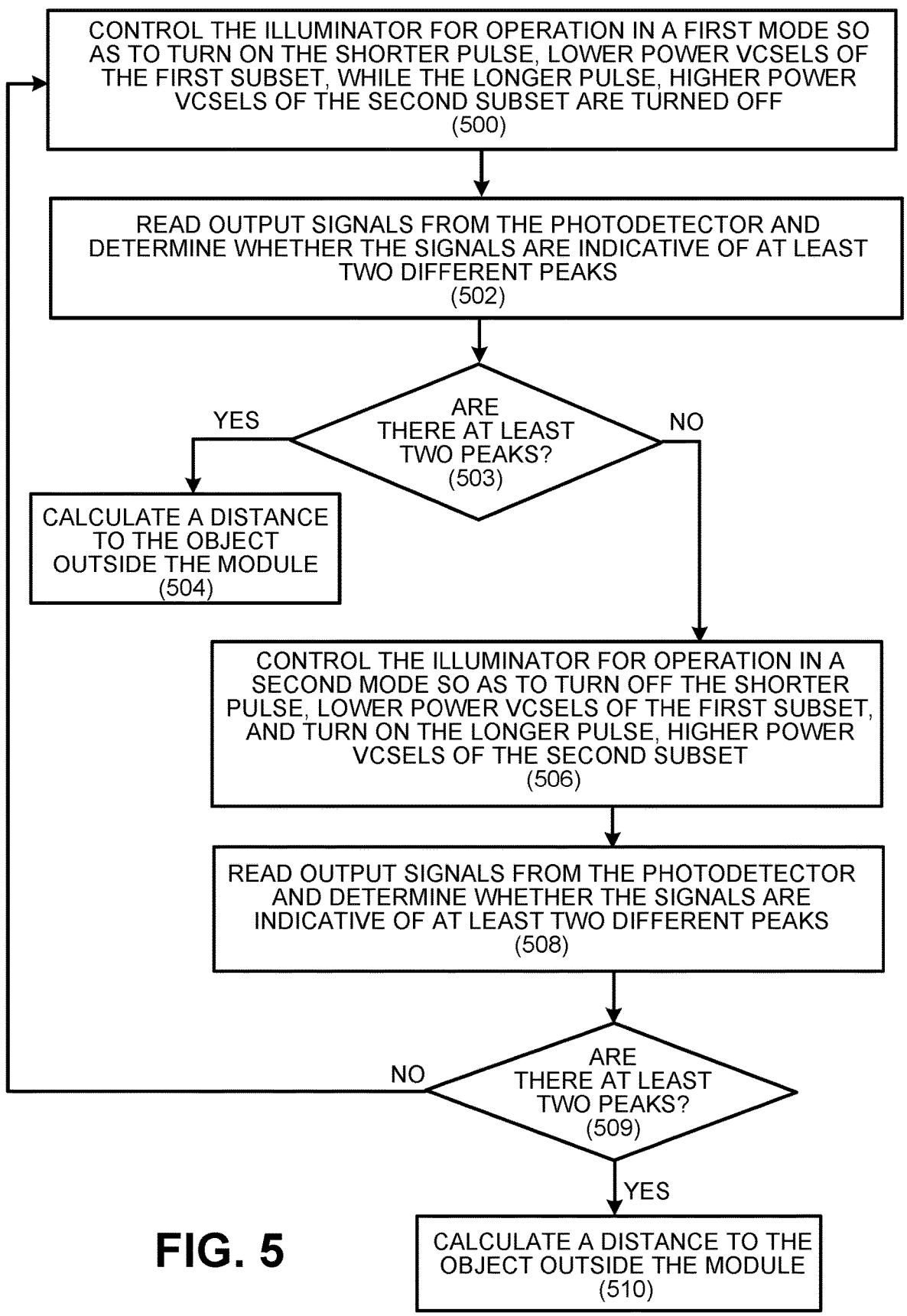
FIG. 5 is a flow chart of a method of operation of the time-of-flight sensor system.

In accordance with some implementations, in operation, the electronic control device 106 controls the illuminator 102 for operation in a first mode so as to activate (i.e., turn on) the shorter pulse, lower power VCSELs of the first subset 402, while the longer pulse, higher power VCSELS of the second subset 404 are deactivated (i.e., turned off) (500 of FIG. 5). Some of the emitted pulses may be reflected by an object back toward the TOF system and detected by the photodetector. The electronic control device 106 reads or otherwise acquires output signals from the photodetector and determines whether the signals are indicative of at least two different peaks (e.g., one peak representing signals reflected by a cover glass and another peak representing signals reflected by an object outside the TOF system, but relatively close to the cover glass of the host device) (502). It the electronic control device 106 determines there are at least two such peaks (503), then it can use the information associated with one or both peaks to calculate a distance to the object outside the system (504). For example, the electronic control device 106 may extract information associated with the peak representing signals reflected by an object outside the TOF system and calculate the distance based on the data for that peak alone. In other implementations, the electronic control device 106 may calculate the distance based, in part, on the separation between the two peaks. Assuming that one of the peaks represents signals reflected by a cover glass at a known, fixed distance, that peak can be used as a reference.

If, at 503, the electronic control device 106 determines, for example, that two or more distinct peaks for the signals detected by the photodetector are not clearly discerned, then the electronic control device 106 controls the illuminator 102 for operation in a second mode so as to deactivate (i.e., turn off) the shorter pulse, lower power VCSELs of the first subset 402, and activate (i.e., turn on) the longer pulse, higher power VCSELS of the second subset 404 (506 of FIG. 5). As before, some of the emitted pulses may be reflected by an object back toward the TOF system and detected by the photodetector. The electronic control device 106 reads or otherwise acquires output signals from the photodetector and determines whether the signals are indicative of at least two different peaks (e.g., one peak representing signals reflected by a cover glass and another peak representing signals reflected by an object outside the TOF system, but relatively distance from the cover glass of the host device) (508). It the electronic control device 106 determines there are at least two such peaks (509), then it can use the information associated with one or both peaks to calculate a distance to the object outside the system (510). For example, the electronic control device 106 may extract information associated with the peak representing signals reflected by an object outside the TOF system and calculate the distance based on the data for that peak alone. In other implementations, the electronic control device 106 may calculate the distance based, in part, on the separation between the two peaks. As noted above, assuming that one of the peaks represents signals reflected by a cover glass at a known, fixed distance, that peak can be used as a reference.

In some instances, there may be no peak corresponding to reflections from a cover glass. Nevertheless, it still can be advantageous to switch between the first and second pulse modes because the short pulse may provide better precision for detecting short range. Further, multiple peaks may be present, in some cases, as a result of multiple reflections from the scene (e.g., a semitransparent object).

In some implementations, the electronic control device 106 controls the illuminator 102 for operation in the second mode and then the first mode. Further, in some implementations, the electronic control device 106 controls the illuminator 102 to alternate repeatedly between operation in the first mode and operation in the second mode. For example, for a three-dimensional pixel matrix, it may be desirable to operate both modes alternatingly, as some pixels may be able to sense a close object whereas others not.

In some instances, the short pulses emitted during the first mode of operation may be much less than 100 psec. For example, in some cases, the pulses may have a width of 50 psec or less. The smaller pulse widths can facilitate measuring smaller distances (e.g., on the order of 1-2 cm). On the other hand, in some instances, the longer pulses emitted during the second mode of operation may be much larger than 100 psec. For example, in some cases, the pulses may have a width of 250 psec or more. The larger pulse widths can facilitate measuring larger distances (e.g., on the order of 1 meter or more). In any event, the use of two modes, each of which uses pulses having a respective width that differs from the pulses of the other mode, can help extend the overall effective TOF distance measurement range. In some instances, the configuration of the TOF photodetector 104 is adjusted when the pulse length and/or pulse power is modified in order to optimize the detection. Also, in some cases, the photodetector (e.g., SPAD or SPAD array with time-to-digital converters (TDCs)) may be operated differently depending on the selected pulse mode.

In some instances more than two different pulse lengths having different respective pulse power settings can be used to optimize detection for more than two depth ranges. Thus, for example, the illuminator can include a third subset of VCSELs operable to emit pulses of light having a third width that differs from the first and second widths. The illuminator can be operable in a third mode in which the third subset of VCSELs emits pulses having the third width, and wherein the electronic control device is operable to estimate a distance to the object based on signals from the photodetector when the illuminator is operating in the third mode if the distance to the object is within a third range that differs from the first and second ranges.

The sensor systems described in this disclosure can, in some instances, improve the performance of the host devices. For example, using the techniques described herein, a sensor system can obtain measurements that are more accurate and/or precise, or that consume less power (e.g., compared to measurements conducted without the performance of the disclosed techniques). Further, the host device (e.g., a vehicle, a robot, a mobile device, etc.) can use these measurements to ascertain its surroundings more accurately, and more effectively adapt their operations based on this information.

Figure 6:
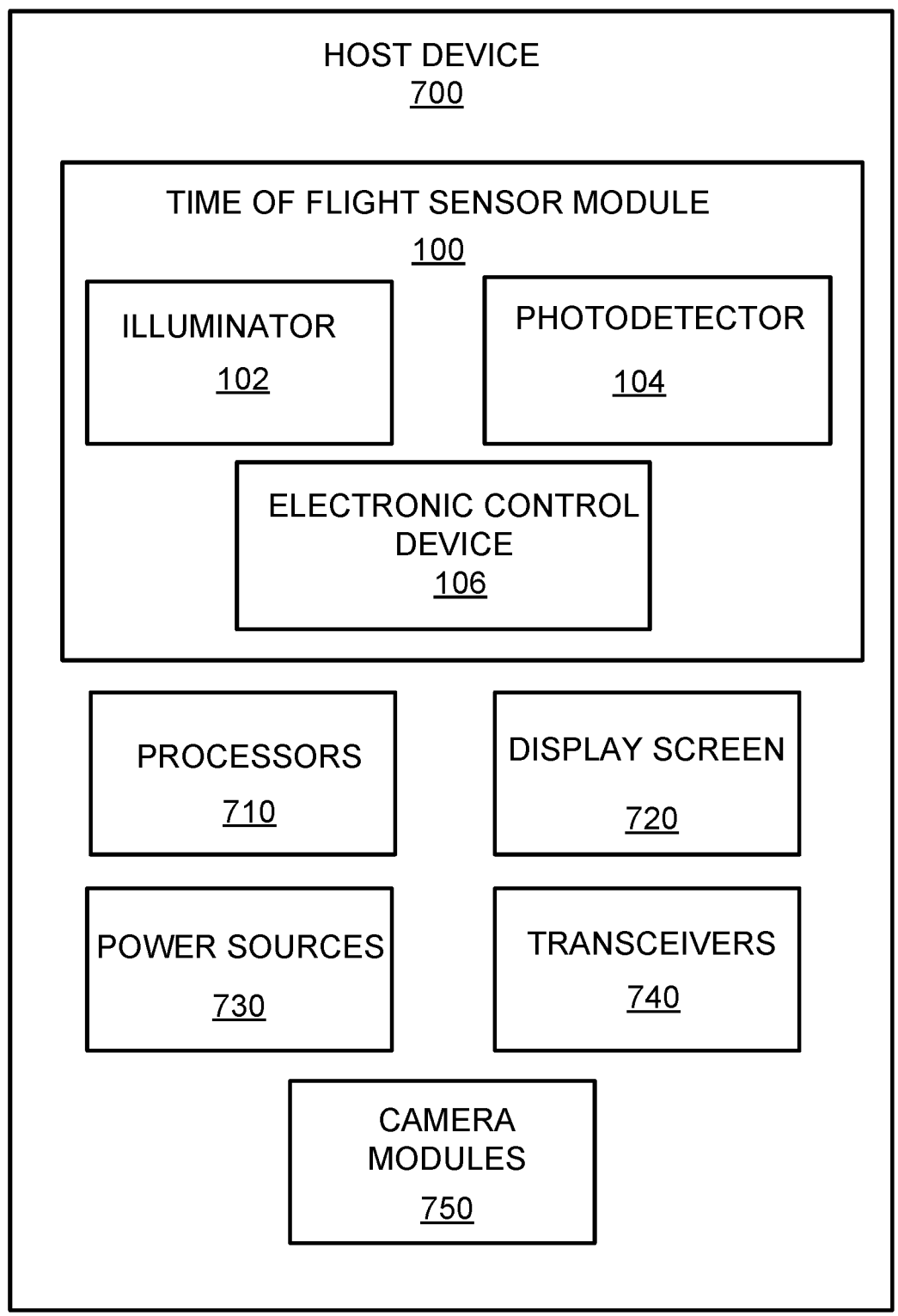
FIG. 6 is an example of a host device that includes a time-of-flight sensor system.

As an example, FIG. 6 shows a host device 700 including a time-of-flight sensor system 100 (including an illuminator 102, a photodetector 104, and an electronic control device 106) disposed behind a cover glass of the host device. The host device 700 also can include several additional components, including one or more computer processors 710 (e.g., to implement the electronic control device 106 and/or to provide other computation functions), a display screen 720, one or more power sources 730 (e.g., batteries, charging circuits), one or more transceivers 740 (e.g., a wireless radio, such a Wi-Fi radio, cellular radio, Bluetooth radio), and one or more camera modules 750. During operation of the host device 700, the host device 700 can obtain information regarding its surroundings (e.g., information regarding the presence of objects in proximity to the host device 700, and the distance of those objects from the host device 700) using the sensor system 100.

Further, in some implementations, the host device 700 is operable to modify its operations based on the information based on by the sensor system 100. For instance, where the host device 700 is a smart phone, in response to determining the distance between an object (e.g., a user's ear of other part of the user's head) and the sensor system 100, the host device 700 may adjust the brightness of the display screen 720 so as to conserve power while the user is not looking at the screen.

In other instances, the host device 700 can be operable to adjust the focus of one or more camera modules based on the estimated distance (e.g., to obtain clearer or sharper images of a detected object). As another example, the host device 700 can generate a map or other spatial representation of its environment, including information regarding the location of the object in the environment. As another example, the host device 700 can generate one or more graphical display elements that vary according the surrounding environment (e.g., an "augmented reality" graphical user interface including a video or image of the surrounding environment, and one or graphical overlays identifying objects in the video or image). Further still, the host device 700 can transmit information regarding the objects to one or more other devices (e.g., one or more other host devices), such that other devices also have access to the information.

The TOF sensor systems described here also can be used for other applications such as other types of portable computing devices (e.g., tablet computers, wearable devices, personal digital assistants (PDAs)), as well as robotics systems, spacecraft navigation, augmented and virtual reality (AR/VR), (drone-based) surveillance, vehicular sensing systems, including advanced driver assistance systems (ADAS) and autonomous cars.

Various aspects of the subject matter and the functional operations described in this specification (e.g., the electronic control device 106) can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

Aspects of the processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device (e.g., a mobile telephone). Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also can be implemented in combination in a single embodiment. Conversely, various features that are described in the context of a single embodiment can also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Accordingly, other implementations are within the scope of the claims.

What is claimed is:

1. An apparatus comprising:
a time-of-flight (TOF) sensor system including:
an illuminator operable to emit pulses of light toward an object outside the apparatus, wherein the illuminator is operable in a first mode in which the illuminator emits pulses having a first width and a second mode in which the illuminator emits pulses having a second width longer than the first width and wherein the illuminator comprises a plurality of vertical cavity surface emitting lasers (VCSELs); and
a photodetector operable to detect light produced by the illuminator and reflected by the object back toward the apparatus;
the apparatus further including an electronic control device operable to control emission of light by the illuminator and operable to estimate a distance to the object based on a time elapsed between an emission of one or more of the pulses by the illuminator and detection of the reflected light by the photodetector,
wherein the electronic control device is operable to estimate a distance to the object based on signals from the photodetector when the illuminator is operating in the first mode if the distance to the object is within a first distance measurement range, and wherein the electronic control device is operable to estimate a distance to the object based on signals from the photodetector when the illuminator is operating in the second mode if the distance to the object is in a second distance measurement range that differs from the first distance measurement range, and
wherein a first subset of the VCSELs is operable to emit the pulses of light having the first width, and wherein a second subset of the VCSELs is operable to emit the pulses of light having the second width.

2. The apparatus of claim 1 wherein there are a greater number of VCSELs in the second subset than in the first subset.

3. The apparatus of claim 1 wherein the VCSELs in the first subset differ are of a different type from the VCSELs in the second subset, and wherein the VCSELs of the first and second subsets are in the same monolithic die.

4. The apparatus claim 1 wherein the electronic control device is operable alternately to activate one of the subsets of VCSELs at a time.

5. The apparatus of claim 1 wherein a third subset of the VCSELs is operable to emit pulses of light having a third width that differs from the first and second widths, wherein the illuminator is operable in a third mode in which the third subset of VCSELs emits pulses having the third width, and wherein the electronic control device is operable to estimate a distance to the object based on signals from the photodetector when the illuminator is operating in the third mode if the distance to the object is within a third distance measurement range that differs from the first and second distance measurement ranges.

6. The apparatus of claim 1 wherein the illuminator is operable in the first mode to emit pulses having a width of less than 100 psec, and is operable in the second mode to emit pulses having a width greater than 100 psec.

7. The apparatus of claim 1 wherein the illuminator is operable in the first mode to emit pulses having a first optical power level, and wherein the illuminator is operable in the second mode to emit pulses having a second optical power level greater than the first optical power level.

8. The apparatus of claim 7 wherein the illuminator is operable in the first mode to emit pulses having a power less than 100 mW, and wherein the illuminator is operable in the second mode to emit pulses having a power greater than 100 mW.

9. A host device comprising:
a time-of-flight (TOF) sensor system including:
an illuminator operable to emit pulses of light toward an object outside the host device, wherein the illuminator is operable in a first mode in which the illuminator emits pulses having a first width and a second mode in which the illuminator emits pulses having a second width longer than the first width and wherein the illuminator comprises a plurality of vertical cavity surface emitting lasers (VCSELs); and
a photodetector operable to detect light produced by the illuminator and reflected by the object back toward the host device;
the host device further including:
an electronic control device operable to control emission of light by the illuminator and operable to estimate a distance to the object based on a time elapsed between an emission of one or more the pulses by the illuminator and detection of the reflected light by the photodetector;
a display screen; and
a processor to adjust a brightness of the display screen in response to a distance estimated by the electronic control device,
wherein the electronic control device is operable to estimate a distance to the object based on signals from the photodetector when the illuminator is operating in the first mode if the distance to the object is within a first distance measurement range, and wherein the electronic control device is operable to estimate a distance to the object based on signals from the photodetector when the illuminator is operating in the second mode if the distance to the object is in a second distance measurement range that differs from the first distance measurement range, and
wherein a first subset of the VCSELs is operable to emit the pulses of light having the first width, and wherein a second subset of the VCSELs is operable to emit the pulses of light having the second width.

10. The host device of claim 9 wherein the VCSELs in the first subset differ are of a different type from the VCSELs in the second subset, and wherein the VCSELs of the first and second subsets are in the same monolithic die.

11. The host device of claim 9 wherein a third subset of the VCSELs is operable to emit pulses of light having a third width that differs from the first and second widths, wherein the illuminator is operable in a third mode in which the third subset of VCSELs emits pulses having the third width, and wherein the electronic control device is operable to estimate a distance to the object based on signals from the photodetector when the illuminator is operating in the third mode if the distance to the object is within a third distance measurement range that differs from the first and second distance measurement ranges.

12. A method comprising:
emitting pulses of light toward an object, wherein emitting pulses includes emitting pulses in a first mode using a first group of light emitting elements and in a second mode using a second group of light emitting elements different from the first group, wherein in the first mode, the pulses have a first width, and wherein in the second mode, the pulses have a second width longer than the first width;

detecting light reflected by the object, the detected light comprising reflected emitting pulses from the first group of light emitting elements and reflected emitting pulses from the second group of light emitting elements; and estimating a distance to the object based on a time elapsed between emission of one or more of the pulses and detection of the light reflected by the object, comprising determining whether at least two peaks are detected from the light reflected by the object and estimating a distance based on at least one of the two detected peaks.

13. The method of claim 12 wherein in the first mode, the pulses have a first optical power level, and wherein in the second mode, the pulses have a second optical power level greater than the first optical power level.

14. The method of claim 12 wherein the first group of light emitting elements is activated in the first mode, and wherein the second group of light emitting elements is activated in the second mode.

15. The method of claim 12 wherein emitting pulses further includes emitting pulses in a third mode using a third group of light emitting elements, wherein in the third mode, the pulses have a third width that differs from the first and second widths; the method further including estimating a distance to the object based on operation in the third mode if the distance to the object is in a third distance measurement range that differs from the first and second distance measurement ranges.

16. The method of claim 12, wherein determining whether at least two peaks are detected from the light reflected by the object and estimating a distance based on at least one of the two detected peaks further comprises determining whether at least two different peaks are detected from the reflected emitting pulses from the first group of light emitting elements, and estimating the distance to the object based on the at least two different peaks detected from the reflected emitting pulses from the first group of light emitting elements.

17. The method of claim 16, wherein determining whether at least two peaks are detected from the light reflected by the object and estimating a distance based on at least one of the two detected peaks further comprises determining whether at least two different peaks are detected from the reflected emitting pulses from the second group of light emitting elements, and estimating the distance to the object based on the at least two different peaks detected from the reflected emitting pulses from the second group of light emitting elements.

18. The method of claim 17, wherein the determining whether at least two different peaks are detected from the reflected emitting pulses from the second group of light emitting elements, and estimating the distance to the object based on the at least two different peaks detected from the reflected emitting pulses from the second group of light emitting elements occurs in response to not determining at least two different peaks from the reflected emitting pulses from the first group of light emitting elements.

* * * * *